United States Patent Office 2,997,206
Patented Aug. 22, 1961

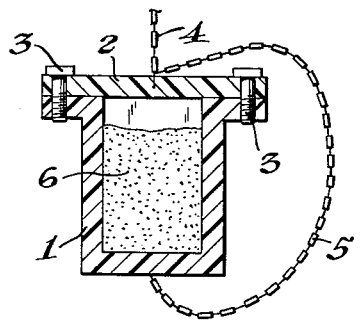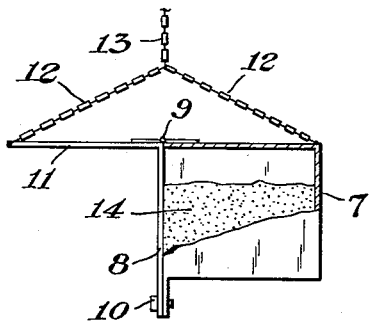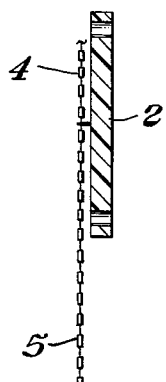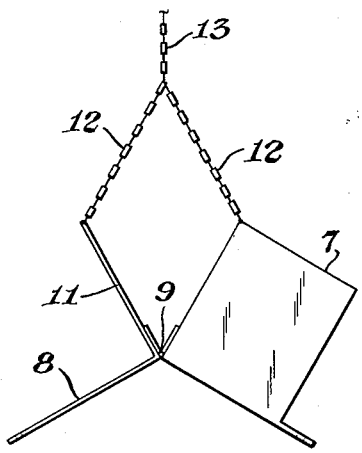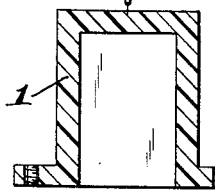

2,997,206
AUTOMATIC CATALYST RELEASING
APPARATUS
Jan E. Vandegaer, Easton, Pa., and John L. Lang, Midland, Mich., assignors to The Dow Chemical Company, Midland, Mich., a corporation of Delaware
Filed June 22, 1959, Ser. No. 821,820
2 Claims. (Cl. 222—54)

This invention relates to a container, and is more particularly concerned with a novel container, whereby catalysts or reaction activators may be automatically released into chemical reactions at the appropriate time.

Catalysts such as ammonium persulfate, potassium persulfate, sodium persulfate, benzoyl peroxide, cymene hydrogen peroxide, and the like are often used to catalyze or activate chemical reactions. Although such catalysts are substantially stable at room temperatures, they decompose into free radicals at higher temperatures; whereby this source of free radicals serves to initiate the chemical reaction. In batch-wise operations, it is important that the reaction be initiated at substantially identical temperatures each run to insure consistent end products and yields. If the reactor is loaded with the reagents and the catalyst at the beginning of the process, the reaction rate of the reactants will depend upon the temperature and time at which the catalyst begins to decompose. These variables are not always consistent.

One means of insuring consistent reaction-products is to introduce the catalyst into the reactor when the selected reaction temperature has been attained. This is not always convenient when the operating temperatures are high, reagents are gaseous, or vapor pressures are high.

The objects of this invention are: (1) to provide a releasing apparatus for catalysts which embodies an automatic releasing means; and (2) to provide a means for releasing the catalyst at a predetermined temperature. Other objects will become apparent hereinafter.

According to our invention, the container is closed by means of bolts, clamps, rivets or the like made from a solid material with a melting point slightly lower than the temperature of the proposed reaction. The container is hung in the reactor by means of a chain or other such hanging device. This hanging device is attached to the container in a manner designed to tip the container upside down when the bolts, clamps, rivets or the like, keeping the container closed, melt to the predetermined temperature. When the fastening means melts and tips the container, the catalyst is readily released from the container into the reaction vessel.

Referring now to the drawings:
FIGURE 1 is a sectional elevation of a closed container embodying the invention.
FIGURE 2 is another sectional elevation of the container represented in FIGURE 1, but in an opened position.
FIGURE 3 is a side elevation partially in section of another closed container embodying the invention.
FIGURE 4 is a side elevation of the container represented in FIGURE 3, but in an opened position.

In FIGURE 1, the container 1 is closed with a cover 2 by means of fusible bolts 3. The container is hung from a rope, string or chain 4 connected to its cover 2. Said cover 2 is connected to the bottom of the container by means of another piece of chain string or rope 5. The container is filled with catalyst 6.

In FIGURE 2, the same container 1 is hanging upside down from the chain 4 and 5 while the cover 2 is supported from chain 4.

In FIGURE 3, the container 7 is closed with a cover 8 secured with a hinge 9 and a fusible bolt, clamp or rivet 10. A lever 11 is rigidly and normally fixed to the cover 2 in the vicinity of the middle of hinge 9. A chain 12 connects the bottom of the container 1 and the extreme end of the lever 11. The middle of chain 12 is attached to another chain 13 which supports the whole container and its attachments. The container is filled with catalyst 14.

In FIGURE 4, the container 7 is shown in a tripped open position hanging on chain 13 and chain 12 which is secured to the extreme end of lever 11 and the bottom of container 7. As in FIGURE 3, the cover 8 is secured with a hinge 9 to container 7.

In operation, a container as described in FIGURE 1 or 3 is filled with a liquid or solid catalyst, or solution thereof. The cover is closed by means of one or more fusible bolts, clamps, rivets, or other such fastening means. The container is then suspended inside the reaction vessel by means of chain 4 in FIGURE 1, or by chain 13 in FIGURE 2.

When all the reactants are added to the reaction vessel, the vessel may be closed and pressurized with the automatic catalyst releasing device inserted therein. The vessel can then be heated to the temperature desired for the specific reaction. Bolts 3 and 10 should be constructed from an alloy or other such material having a melting point not higher than the reaction temperature, and preferably a few degrees lower than the reaction temperature. When the melting point of the alloy is reached, the bolts will melt and allow the container to open as shown in FIGURES 2 and 4. When the catalyst is uniformly released in this manner, the reaction will begin at substantially the same temperature in all successive runs.

The container, as shown in the drawings and described above, may be made of metal, plastic, or other such suitable materials which are not subject to corrosion by the catalyst or the other ingredients in the reaction vessel.

The chains 4, 5, 12 and 13 used for supporting and tripping the container may be constructed of any selected chemically inert elongated, flexible member, such as rope, string, wire, or the like.

The fusible bolts, clamps, rivets or fasteners may consist of a low melting alloy such as Wood's metal, Rose's metal, Lipowitz's alloy, bismuth solder, alloys and mixtures thereof, or any other suitable material, providing such material has a melting point below the given reaction temperature.

Various modifications may be made in the present invention without departing from the spirit or scope thereof and it is to be understood that we limit ourselves only as defined in the appended claims.

We claim:
1. A dispensing device for catalysts and the like comprising a container, a cover member therefor, an elongated support member attached to said cover member, said cover member being fastened to said container by a solid, fusible material and connected to the bottom of said container by means of a flexible member, said solid fusible material adapted to melt and disengage said cover member from said container at a predetermined temperature to thereby dispense the contents of said container at said predetermined temperature.

2. A dispensing device for catalysts and the like comprising a container, a cover member therefor, an elongated support member attached to said container and to said cover member, said cover member having, as part thereof, a lever arm, and being hinged thereat to said container, said cover member being fastened to said container in a closed position by a solid, fusible material adapted to melt and release said cover member from its closed position at a predetermined temperature to thereby dispense the contents of said container at said predetermined temperature.

References Cited in the file of this patent

UNITED STATES PATENTS

| 1,582,218 | Hipwell et al. | Apr. 27, 1926 |
| 2,698,022 | Fahnoe | Dec. 28, 1954 |